US012686300B2

(12) United States Patent
Choi et al.

(10) Patent No.: US 12,686,300 B2
(45) Date of Patent: Jul. 21, 2026

(54) SUPPLEMENTARY CHARGING FOR LOW-VOLTAGE BATTERY BASED ON REDUNDANCY POWER CONVERSION AND SYSTEM FOR THE SAME

(71) Applicants: HYUNDAI MOTOR COMPANY, Seoul (KR); Kia Corporation, Seoul (KR)

(72) Inventors: Byung Yoon Choi, Hwaseong-si (KR); Soon Cheol Hwang, Hwaseong-si (KR); Jae Ho Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/931,865

(22) Filed: Oct. 30, 2024

(65) Prior Publication Data

US 2025/0196716 A1     Jun. 19, 2025

(30) Foreign Application Priority Data

Dec. 19, 2023     (KR) ........................ 10-2023-0185978

(51) Int. Cl.
| | |
|---|---|
| *B60L 58/20* | (2019.01) |
| *B60L 1/00* | (2006.01) |
| *B60L 58/12* | (2019.01) |
| *H02J 7/00* | (2026.01) |
| *H02J 7/34* | (2006.01) |
| *H02J 7/80* | (2026.01) |

(52) U.S. Cl.
CPC ................. *B60L 58/20* (2019.02); *B60L 1/00* (2013.01); *B60L 58/12* (2019.02); *H02J 7/342*
(2020.01); *H02J 7/485* (2026.01); *H02J 7/80* (2026.01); *H02J 7/865* (2026.01); *H02J 2207/20* (2020.01)

(58) Field of Classification Search
CPC ........ B60L 58/20; B60L 1/00; H02J 7/00047; H02J 7/342; H02J 7/0068; H02J 2207/20
See application file for complete search history.

(56) References Cited

U.S. PATENT DOCUMENTS

| | | | |
|---|---|---|---|
| 2022/0085641 A1* | 3/2022 | Hirota ..................... | B60L 50/60 |
| 2023/0062219 A1* | 3/2023 | Miyata .................. | B60L 3/0092 |
| 2024/0154433 A1* | 5/2024 | Kim ........................ | B60L 53/22 |

FOREIGN PATENT DOCUMENTS

| | | | |
|---|---|---|---|
| JP | 2011160613 A * | 8/2011 | ............... H02J 7/00 |

* cited by examiner

*Primary Examiner* — Ryan Johnson
*Assistant Examiner* — Duc M Pham
(74) *Attorney, Agent, or Firm* — Morgan Lewis & Bockius LLP

(57) ABSTRACT

A method for performing supplementary charging on a low-voltage battery based on redundancy power conversion, includes: determining whether supplementary charging is required for a first low-voltage battery or a second low-voltage battery in a parked state; determining whether supplementary charging mode entering using a voltage of a high-voltage battery is possible when it is determined that the supplementary charging is required; and converting and supplying a charging voltage of another low-voltage battery to a low-voltage battery that requires supplementary charging among the first low-voltage battery or the second low-voltage battery when a condition that does not allow the supplementary charging mode entering is determined.

18 Claims, 6 Drawing Sheets

SUPPLEMENTARY CHARGING FOR LOW-VOLTAGE BATTERY BASED ON REDUNDANCY POWER CONVERSION AND SYSTEM FOR THE SAME

CROSS-REFERENCE TO RELATED APPLICATIONS

The present application claims priority to Korean Patent Application No. 10-2023-0185978, filed on Dec. 19, 2023, the entire contents of which is incorporated herein for all purposes by this reference.

BACKGROUND OF THE PRESENT DISCLOSURE

Field of the Present Disclosure

The present disclosure relates to a supplementary charging method for a low-voltage battery, and more particularly, to a supplementary charging method for a low-voltage battery based on redundancy power conversion to charge a low-voltage battery having a relatively low charged state by use of a low-voltage battery having a relatively high charged state based on a redundancy power conversion technology when a normal supplementary charging process using a high-voltage battery is not performed although the low-voltage battery requires the supplementary charging.

Description of Related Art

In an automotive-related industry, a demand for improving a fuel economy has been continuously issued due to vehicle environmental requirements and high fuel prices, and various researches and developments are being performed according to above-described paradigm changes. In recent years, various types of researches and developments for improving the fuel economy are being performed in response to strengthened fuel economy regulations for vehicle companies, such as corporate average fuel economy (CAFE). As a part of the present technological development, vehicle developments such as a battery EV and a Hybrid EV that use electrical energy are being actively examined.

A business for building infrastructure for commercialization of intelligent vehicles and expansion of an autonomous vehicle market cause a continuous investment on autonomous vehicles even in a domestic market. The autonomous vehicles that are capable of autonomously monitoring external information and recognizing a road condition to autonomously drive to a set destination even without an operation of a driver require additional power for various sensors and computing systems compared to general vehicles.

That is, since the autonomous vehicle is operated with a sensor, an internal MCU, and a steering system without intervention of the driver, a problem occurring in internal power may lead a major accident due to lack of power of various sensors, steering systems, or brakes.

A power generation system in a typical autonomous vehicle may be configured to generate short circuit or disconnection in a power system due to an internal defect or an external factor while the autonomous vehicle is driving, generating a problem so that the vehicle stops while driving.

To solve the above-described problem, an autonomous vehicle system realizes a redundancy technology that has dual ECUs and dual power supply devices for emergency driving to a destination without the intervention of the driver although a failure occurs.

The above-described redundancy technology is being developed in various types according to characteristics for each vehicle manufacturing company. Among the various types, a manufacturing company that utilizes both a first operating voltage 24V and a second operating voltage 12V has a redundancy architecture as illustrated in FIG. 1.

When components in FIG. 1 are briefly described for each reference numeral, reference numeral 10 denotes a high voltage junction box (hereinafter, referred to as HV J/BOX) for distributing a high voltage supplied from a main battery.

Also, each of reference numerals 21 and 22 denotes a power conversion controller that converts the high voltage supplied from the HV J/BOX 10 into a low voltage. A first low DC-DC converter (LDC) 21 converts the high voltage into a low voltage of 12V and outputs the converted low voltage, and the second LDC 22 converts the high voltage into a low voltage of 24V and outputs the converted low voltage.

Also, each of reference numerals 31 and 32 denotes an active junction block (AJB) including a back to back switch (B2B) (no reference numeral). The B2B represents a switch having a function of detecting and blocking a power fail. The reference numeral 31 is dedicated to 12V, and the reference numeral 32 is dedicated to 24V.

Also, reference numeral 40 denotes a redundancy power converter (RPC) which is a bidirectional power conversion controller for 12V and 24V.

Also, each of reference numerals 51 and 52 denotes a sub-battery modules (SBM) including a low-voltage battery and an intelligent battery sensor (IBS) which is configured to detect a state of the low-voltage battery. The reference numeral 51 is dedicated to 12V, and the reference numeral 52 is dedicated to 24V.

Also, reference numeral 60 is a power-net domain controller (PDC) that distributes introduced 12V or 24V power to electrical loads denoted by reference numerals 81 and 82.

Also, each of reference numerals 71 and 72 denotes a load (a brake, a control unit, a steering wheel, etc.) related to an operation of a vehicle.

As illustrated in FIG. 1, the power system is configured for simultaneously supplying 12V and 24V power to a low-voltage power network of a commercial vehicle. When a general power (expressed by a solid line) is diagnosed as a failure state by a function for each component, the power system blocks supply of failure power and provide redundancy power.

Here, when a second LDC 22 malfunctions or fails not to perform a normal supply of 24V, the second AJB 32 requests a conversion signal to the RPC 40 through a local communication network in the vehicle as illustrated in FIG. 1. Here, the conversion request signal in FIG. 1 illustrates only a signal line requested from the second AJB 32 for convenience of description.

Accordingly, the RPC 40 converts the 12V power supplied through the first AJB 31 into the 24V power and supplies the converted 24V power to the second AJB 32, and the second AJB 32 supplies the 24V power supplied from the RPC 40 to components connected to a rear end portion thereof, which are denoted by reference numerals 72, 52, and 60.

In the redundancy system which is configured and operated as described above, the first SBM 51 and the second SBM 52 that are used as low-voltage batteries to supply driving power of electronic loads denoted by reference numerals 81 and 82 perform supplementary charging on the low-voltage batteries through the supplementary charging path illustrated in the FIG. 2 in a parked state to stably maintain a vehicle. However, the supplementary charging may not occur in the following conditions.

A first condition in which the supplementary charging is not performed is a case of failures or non-responses of all sorts of support controllers for supplementary charging. A second condition is a case when a wireless update of high-voltage control component is in progress. A third condition is a case when a state of charge (SOC) value of a high-voltage battery is less than 25% due to discharge of the high-voltage battery. A fourth condition is a case when a high-voltage is not forcedly applied during maintenance (maintenance window opened). A fifth condition is a case when IG3 power required for the supplementary charging entering is not applied.

Thus, although supplementary charging of the 12V or 24V battery is required, in the above-described condition that does not allow supplementary charging entering, i.e., a case in which the supplementary charging path expressed by a dashed line in FIG. 2 is not formed, a typical method is simply in a ready state until the condition that does not allow supplementary charging entering is resolved.

However, when the condition that does not allow the supplementary charging entering is not released for a long time, an accident of complete discharge of the 12V or 24V battery may occur to cause claims of customers.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a supplementary charging for a low-voltage battery based on redundancy power conversion and a system for the same, and more particularly, to a method for charging a low-voltage battery including a relatively low charged state by use of a low-voltage battery including a relatively high charged state based on a redundancy power conversion technology when a normal supplementary charging process using a high-voltage battery is not performed although the low-voltage battery requires the supplementary charging.

An exemplary embodiment of the present disclosure provides a method for controlling charging of a battery of a vehicle, the method including determining whether supplementary charging is required for a first low-voltage battery or a second low-voltage battery while the vehicle is in a parked state, determining whether supplementary charging mode entering using a high-voltage battery is possible when it is determined that the supplementary charging is required, and converting and supplying a charging voltage of one low-voltage battery among the first low-voltage battery and the second low-voltage battery to the other low-voltage battery which is determined to require the supplementary charging when the supplementary charging mode entering is not determined to be possible.

In an exemplary embodiment of the present disclosure, the first low-voltage battery may include a 12V low-voltage battery.

In an exemplary embodiment of the present disclosure, the second low-voltage battery may include a 24V low-voltage battery.

In an exemplary embodiment of the present disclosure, the determining of whether the supplementary charging is required may include determining that the supplementary charging is required when a state of charge (SOC) value of the first low-voltage battery or the second low-voltage battery is a first predetermined value (e.g., 80%) or less.

In an exemplary embodiment of the present disclosure, the determining of whether the supplementary charging mode entering using the high-voltage battery is possible includes determining that the supplementary charging mode entering is not possible based on failures or non-responses of related controllers to the supplementary charging.

In an exemplary embodiment of the present disclosure, the determining of whether the supplementary charging mode entering using the high-voltage battery is possible includes determining that the supplementary charging mode entering is not possible based on determining that a update on a control component of the high-voltage battery is in progress.

In an exemplary embodiment of the present disclosure, the determining of whether the supplementary charging mode entering using the high-voltage battery is possible includes determining that the supplementary charging mode entering is not possible based on determining that an SOC value of the high-voltage battery is a second predetermined value (e.g., 25%) or less.

In an exemplary embodiment of the present disclosure, the determining of whether the supplementary charging mode entering using the high-voltage battery is possible includes determining that the supplementary charging mode entering is not possible based on determining that a maintenance operation is in progress as a maintenance window is opened.

In an exemplary embodiment of the present disclosure, the determining of whether the supplementary charging mode entering using the high-voltage battery is possible includes determining that the supplementary charging mode entering is not possible based on determining that an IG3 power mode is not applied in the vehicle, wherein the IG3 power mode is a power mode in which power is applied to at least one controller related to charging by an external power source a high-voltage battery which supplies for the supplementary charging.

In an exemplary embodiment of the present disclosure, the converting and the supplying of the charging voltage includes detecting and comparing SOC values of the first low-voltage battery and the second low-voltage battery, determining to supply a charging voltage of one low-voltage battery including a higher SOC value among the first low-voltage battery and the second low-voltage battery to the other low-voltage battery and forming a supply route, and smoothing by converting a discharge voltage of the one low-voltage battery into a voltage of the other low-voltage battery and supplying the converted voltage through the supply route.

In an exemplary embodiment of the present disclosure, the converting and the supplying of the charging voltage further includes determining whether to continue the smoothing by detecting and comparing the SOC values of the first low-voltage battery and the second low-voltage battery.

In an exemplary embodiment of the present disclosure, the determining of whether to continue the smoothing includes terminating the smoothing when at least one of the SOC values of the first low-voltage battery and the second low-voltage battery is a third predetermined value (e.g., 20%) or less.

In an exemplary embodiment of the present disclosure, the determining of whether to continue the smoothing includes terminating the smoothing when a difference between the SOC values of the first low-voltage battery and the second low-voltage battery is a first preset difference (e.g., 3%) or less.

In an exemplary embodiment of the present disclosure, the detecting and the comparing of the SOC values includes determining estimated discharge time periods of the first low-voltage battery and the second low-voltage battery, forming the supply route when the estimated discharge time period of one low-voltage battery including a lower SOC value is not greater than the estimated discharge time period of the other low-voltage battery, and terminating the smoothing when the estimated discharge time period of the one low-voltage battery is greater than the estimated discharge time period of the other low-voltage battery.

In an exemplary embodiment of the present disclosure, the detecting and the comparing of the SOC values further includes forming of the supply route when a difference between the SOC values is a second preset difference (e.g., 5%) or more, and the SOC value of the one low-voltage battery is a fourth predetermined value (e.g., 60%) or less.

In an exemplary embodiment of the present disclosure, the detecting and the comparing of the SOC values further includes terminating the smoothing when the difference between the SOC values is less than the second preset difference, and the SOC value of the one low-voltage battery is greater than the fourth predetermined value.

In an exemplary embodiment of the present disclosure, there is provided a low-voltage battery supplementary charging system of a vehicle, including a high voltage junction box (HV J/BOX) that distributes a high voltage supplied from a main battery, a first active junction block (AJB) including a back to back switch (B2B), the first AJB receiving a first low voltage output from a first low-voltage direct current (DC) to DC converter (LDC) and supplying the received first low voltage to a first electrical load, a second AJB including a B2B, the second AJB receiving a second low voltage output from a second LDC and supplying the received second low voltage to a second electrical load; a power-net domain controller (PDC) configured to supply power of the first low voltage and the second low voltage to the first electrical load and the second electrical load, a first sub-battery module (SBM) including a first low-voltage battery which is charged by the first low voltage supplied from the first AJB and supplies power to the PDC and the first low-voltage load and a first intelligent battery sensor (IBS) which detects a state of the first low-voltage battery, a second SBM including a second low-voltage battery which is charged by the second low voltage supplied from the second AJB and supplies power to the PDC and the second low voltage load and a second IBS which is configured to detect a state of the second low-voltage battery, and a redundancy power converter (RPC) configured to convert power between the first low voltage and the second low voltage according to a power conversion request signal generated by one AJB among the first AJB and the second AJB and supply the converted power to the one AJB, wherein the PDC is further configured to collect SOC information of the first and second low-voltage batteries from the first IBS and the second IBS, transmit a supplementary charging request signal based on determining that supplementary charging is required, and transmit a smoothing supplementary charging request signal to the RPC based on determining that the supplementary charging is not possible, wherein the RPC is further configured to, in response to the smoothing supplementary charging request signal from the PDC, collect and compare SOC information of the first and second low-voltage batteries from the first IBS and the second IBS and form a supplementary charging path between the first SBM and the second SBM, performing smoothing the supplementary charging.

In an exemplary embodiment of the present disclosure, while the smoothing of the supplementary charging is performed between the first SBM and the second SBM by the RPC, the PDC is further configured to collect SOC information of the first and second low-voltage batteries from the first IBS the second IBS to determine that the supplementary charging is completed, and request to the RPC to terminate the smoothing of the supplementary charging.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

In the figures, the same reference numerals refer to the same or equivalent portions of the present disclosure throughout the several figures of the drawing.

Figure 1:
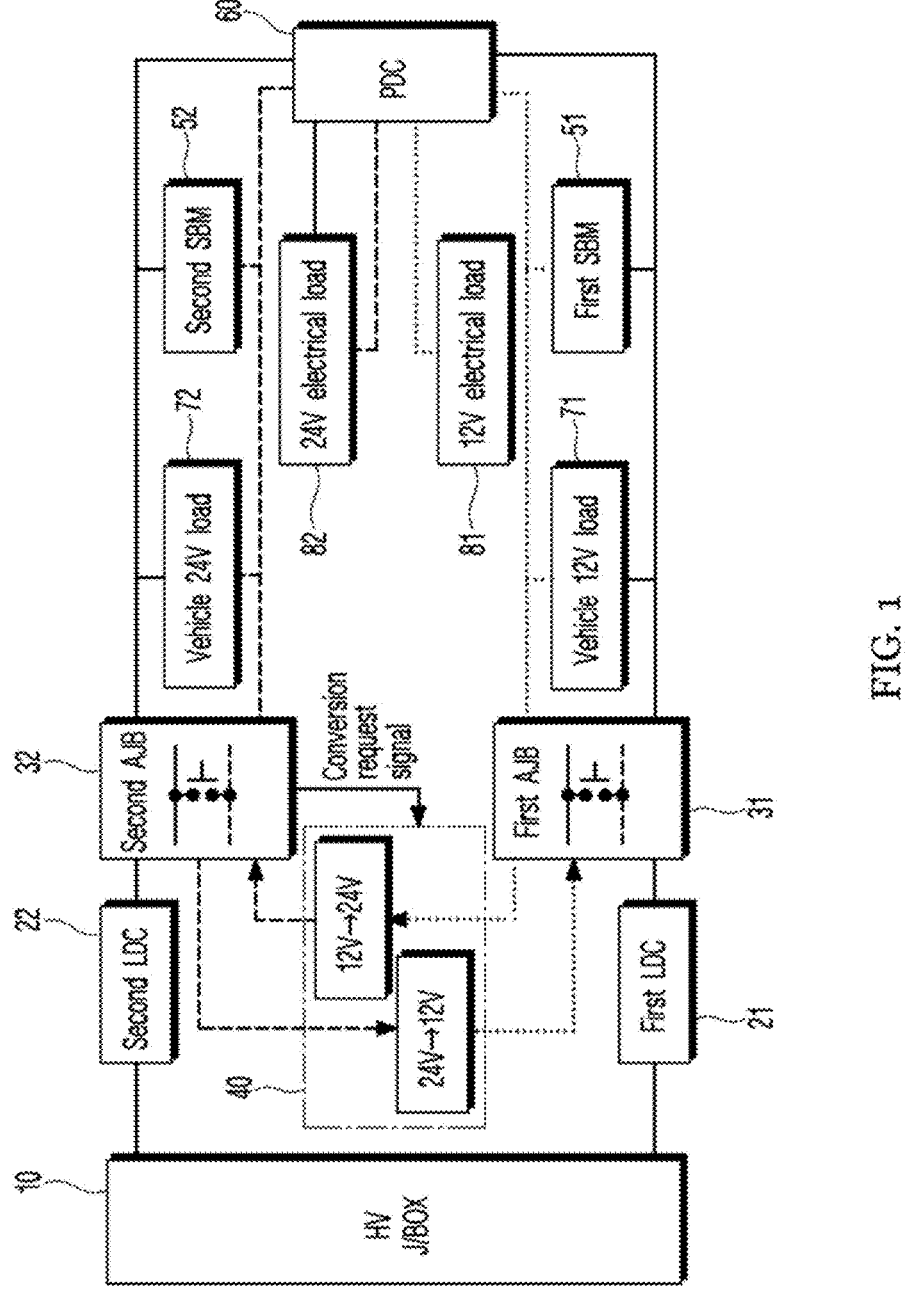
FIG. 1 is a view exemplarily illustrating an example of a typical redundancy architecture of a vehicle, in which electrical loads using 12V power and 24V power are mixed.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Since the present disclosure may have multiple modified embodiments, exemplary embodiments are illustrated in the drawings and are described in the detailed description of the present disclosure. However, this does not limit the present disclosure within the specific embodiments and it should be understood that the present disclosure covers all the modifications, equivalents, and replacements within the idea and technical scope of the present disclosure.

In the present specification, the suffixes "module" and "unit" are used merely for nominal distinction between components and should not be interpreted as implying that the components are physically or chemically separated or that they may be separated.

It will be understood that although the terms of "first" and "second" are used herein to describe various elements, these elements should not be limited by these terms. These terms may be used solely to differentiate one component from another in name, and their sequential meanings are understood through the context of the description rather than by the names themselves.

The term "and/or" is used to include all possible combinations of the listed items. For example, "A and/or B" includes all three cases of "A", "B", and "A and B".

It will also be understood that when an element is referred to as being "connected to" or "engaged with" another element, it may be directly connected to the other element, or intervening elements may also be present.

In the following description, the technical terms are used only for explaining a specific exemplary embodiment while not limiting the present disclosure. The terms of a singular form may include plural forms unless referred to the contrary. The meaning of 'include' or 'comprise' specifies a property, a region, a fixed number, a step, a process, an element and/or a component but does not exclude other properties, regions, fixed numbers, steps, processes, elements and/or components.

Unless terms used in the present disclosure are defined differently, the terms may be construed as meaning known to those skilled in the art. Terms such as terms that are generally used and have been in dictionaries should be construed as having meanings matched with contextual meanings in the art. In the present description, unless defined clearly, terms are not ideally, excessively construed as formal meanings.

Also, the terms unit, control unit, control device, or controller are widely used to name devices that control specific functions and do not refer to a generic functional unit. Also, the devices denoted by the names may include a communication device that communicates with another controller or sensor to control the corresponding function, a computer-readable recording medium that stores an operation system, a logic command, and input/output information, and at least one processor that is configured to perform determinations, decisions, and calculations required for function control.

On the other hand, the processor may include semiconductor integrated circuits and/or electronic elements that perform at least one or more of comparisons, determinations, calculations, and decisions to achieve programmed functions. For example, the processor may be a computer, a microprocessor, CPU, ASIC, an electronic circuitry (logic circuits), or a combination thereof.

Also, the computer readable recording medium (or memory) includes all sorts of data storage devices that store computer readable data. For example, the computer readable recording medium may include at least one of a flash memory type, hard disk type, micro type, card type (e.g., secure digital (SD) card) or eXtream digital (XD) type memory and a random access memory (RAM), static RAM (SRAM), read-only memory (ROM), programmable ROM (PROM), electrically erasable PROM (EEPROM), magnetic RAM (MRAM), magnetic disk, or optical disk type memory.

These recording media may be electrically connected to the processor, and the processor may read data from and write data to the recording media. The recording media and the processor may be integrated with each other or physically separated from each other.

Hereinafter, a method of supplementary charging of a low-voltage battery based on redundancy power conversion according to an exemplary embodiment of the present disclosure will be described with reference to the accompanying drawings.

Figure 3A:
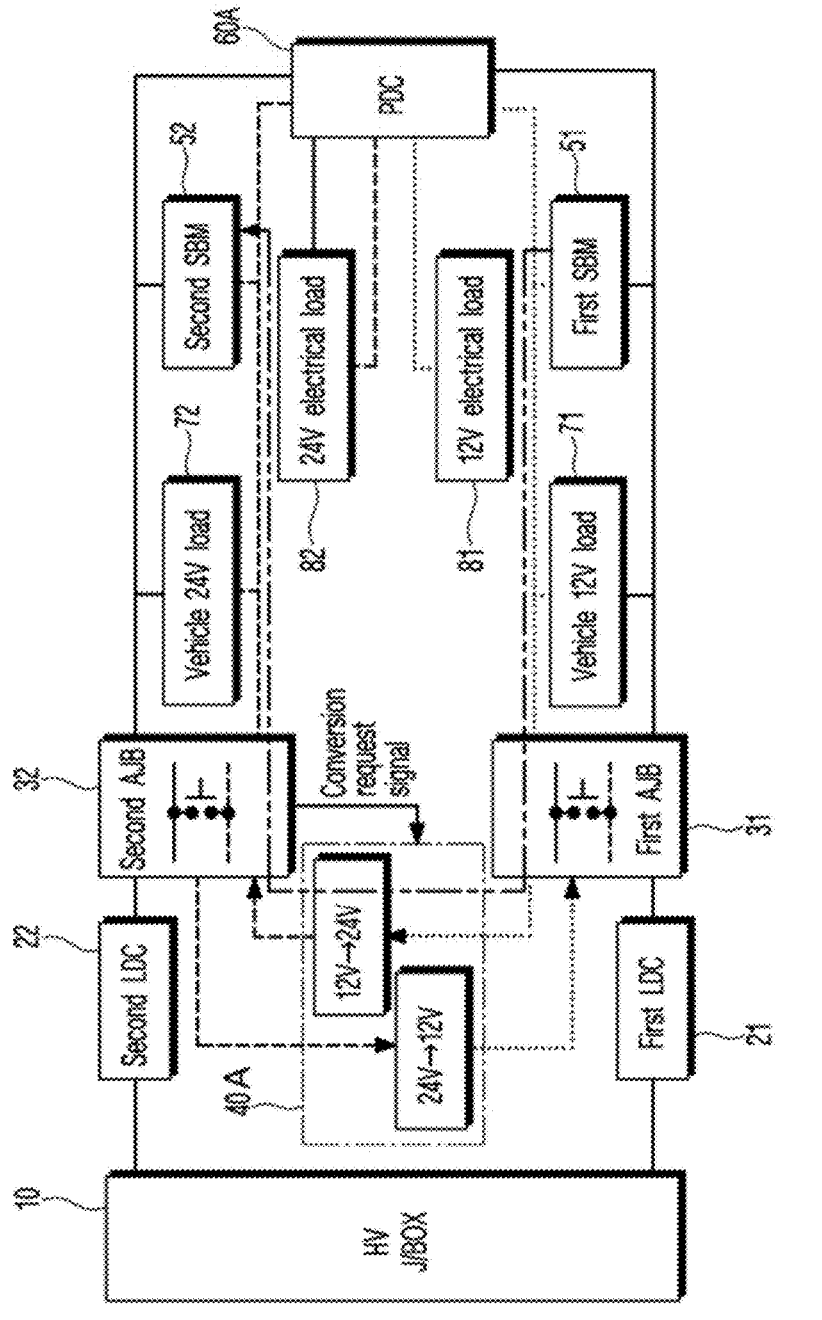
FIG. 3A and FIG. 3B are views exemplarily illustrating an example of a supplementary charging path of a low-voltage battery based on redundancy power conversion according to an exemplary embodiment of the present disclosure.
Figure 3B:
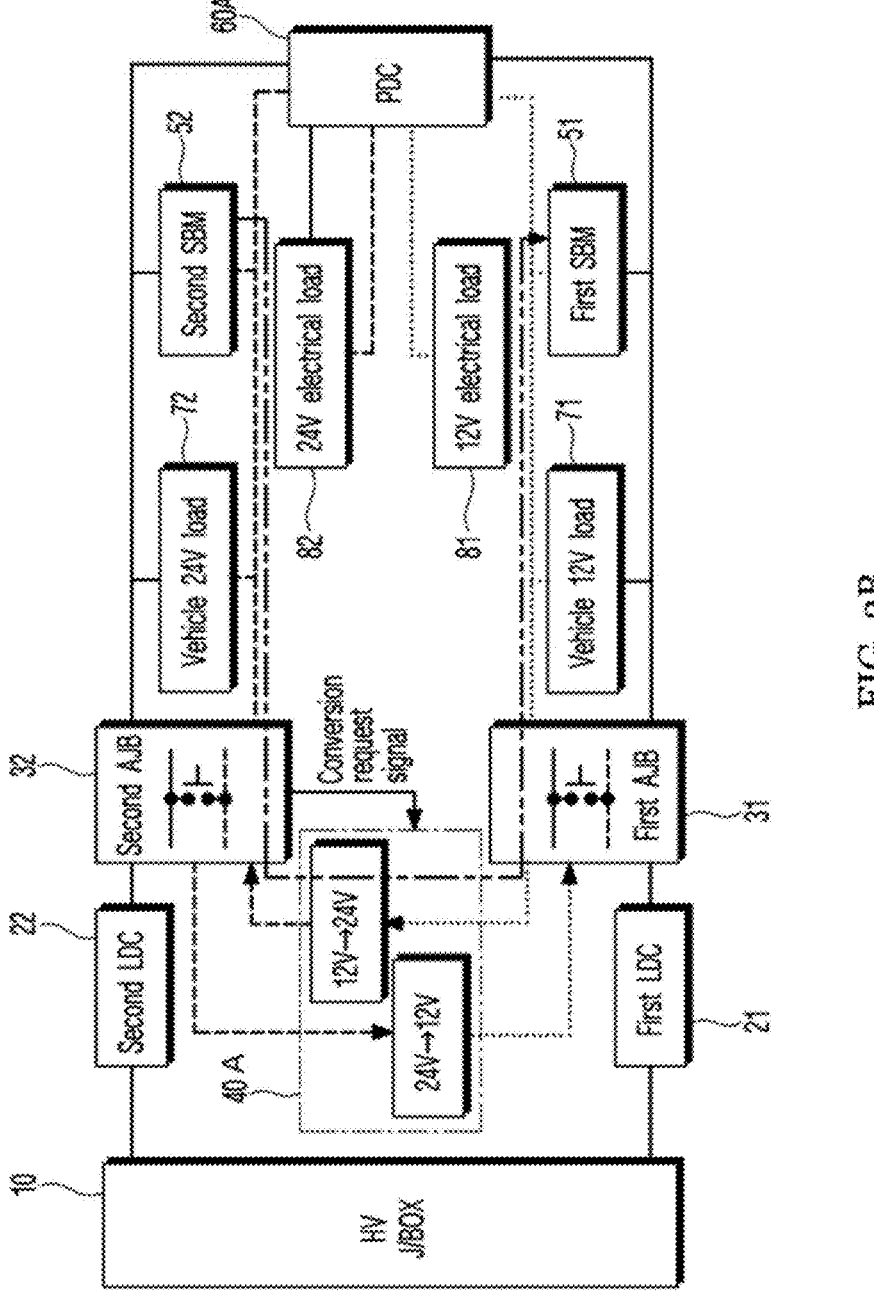
Figure 4A:
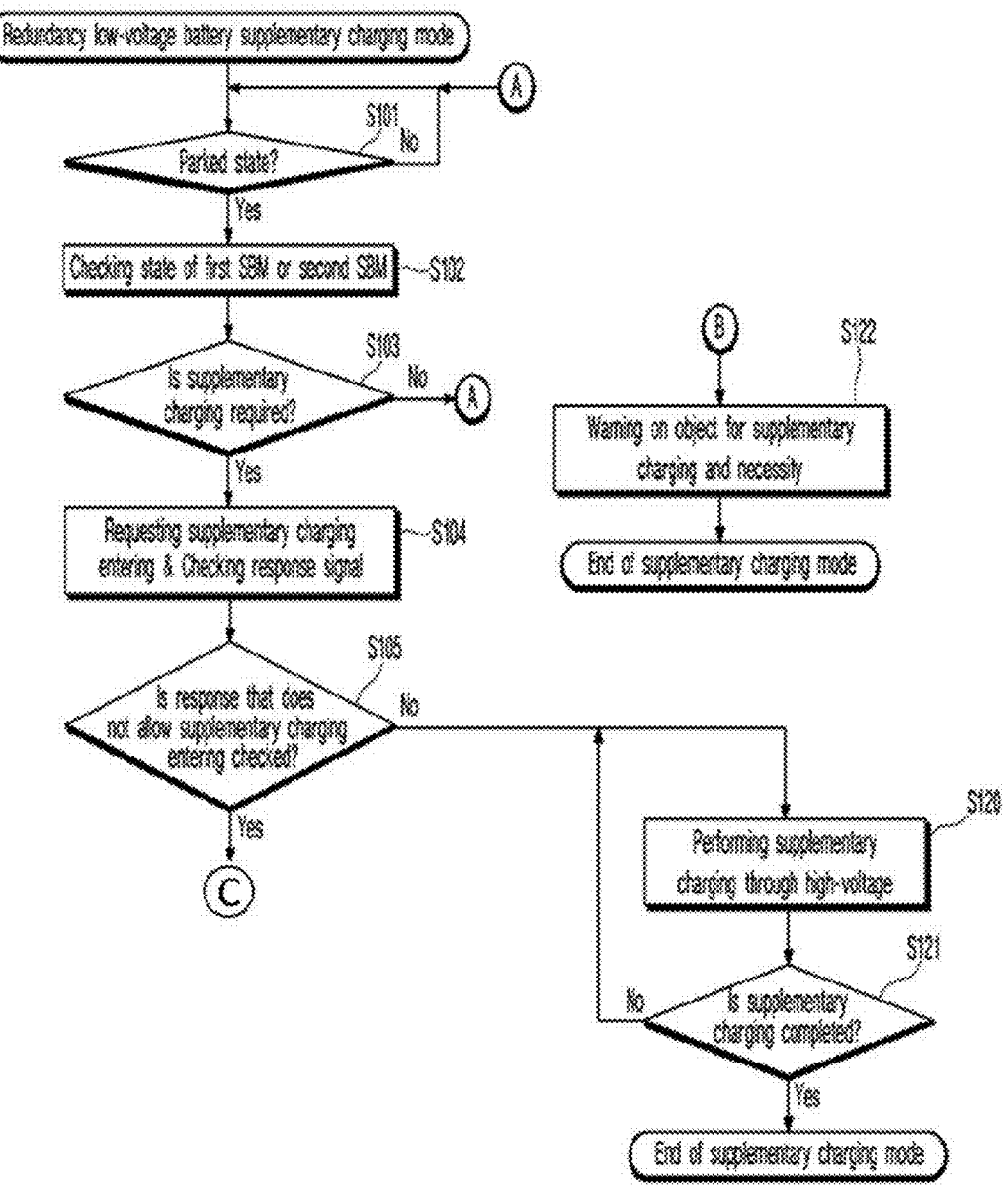
FIG. 4A and FIG. 4B are flowcharts illustrating an example of a process for forming a supplementary charging path of a low-voltage battery based on the redundancy power conversion according to an exemplary embodiment of the present disclosure.
Figure 4B:
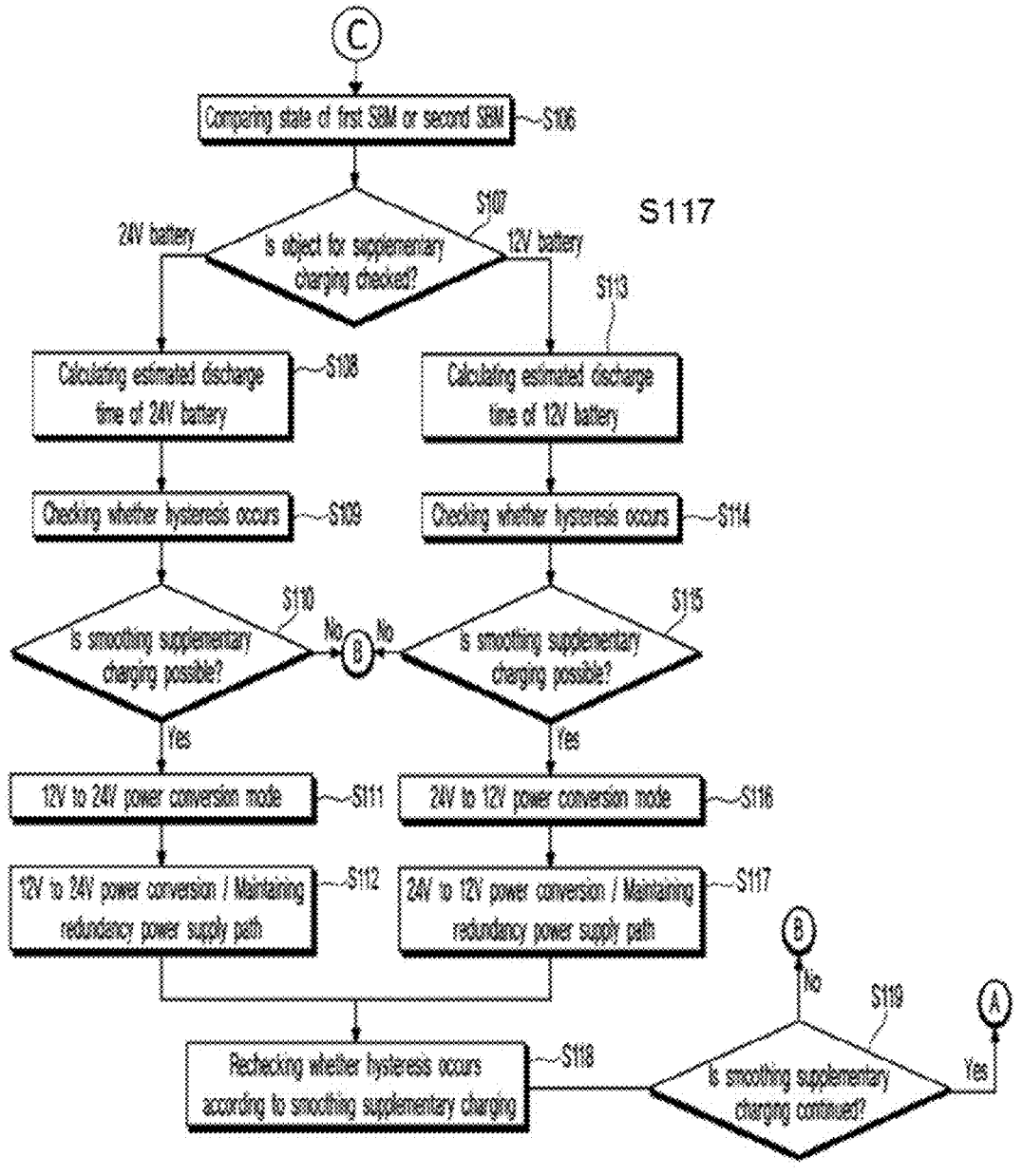

FIG. 3A and FIG. 3B are views exemplarily illustrating an example of a supplementary charging path of a low-voltage battery based on the redundancy power conversion according to an exemplary embodiment of the present disclosure, and FIG. 4A and FIG. 4B are flowcharts illustrating an example of a process for forming the supplementary charging path of the low-voltage battery based on the redundancy power conversion according to an exemplary embodiment of the present disclosure.

FIG. 3A is a view exemplarily illustrating an example of a supplementary charging path of a 24V low-voltage battery based on the redundancy power conversion by use of a 12V low-voltage battery in a condition of requiring a supplementary charging of the 24V low-voltage battery, and FIG. 3B is a view exemplarily illustrating an example of a supplementary charging path of the 12V low-voltage battery based on the redundancy power conversion by use of the 24V low-voltage battery in a condition of requiring a supplementary charging of the 12V low-voltage battery.

Figure 2:
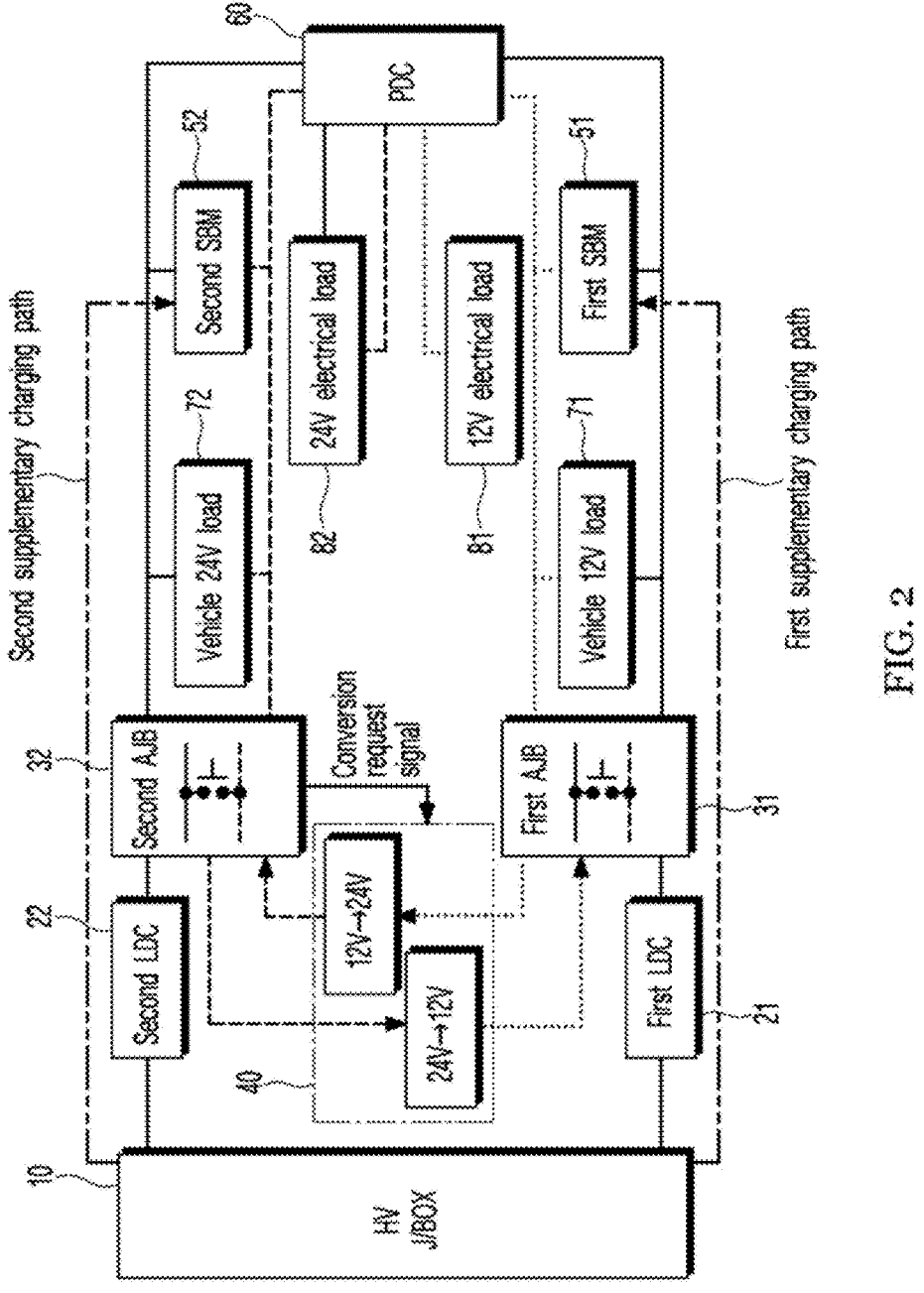
FIG. 2 is a view exemplarily illustrating an example of a supplementary charging path of a low-voltage battery in the redundancy architecture in FIG. 1.

That is, one of the supplementary charging paths of FIG. 3A and FIG. 3B is formed in a condition in which a normal supplementary charging path is not formed as illustrated in FIG. 2 by applying the low-voltage battery supplementary charging method and system based on redundancy power conversion according to an exemplary embodiment of the present disclosure. This process will be described with reference to FIG. 4A and FIG. 4B.

Here, subjects that perform operations of FIG. 4A and FIG. 4B are PDC denoted by reference numeral 60A and RPC denoted by reference numeral 40A in FIG. 3A and FIG. 3B.

That is, the PDC 60A and the RPC 40A have extended functions in comparison with those in FIG. 1 and FIG. 2.

In step S101, the PDC 60A is configured to determine whether a vehicle is in a parked state.

When it is determined in step S101 that the vehicle is in the parked state, the PDC 60A performs step S102 to collect state of charge (SOC) information of the low-voltage battery in corresponding SBMs 51 and 52 from an intelligent battery sensor (IBS) in the first SBM 51 and the second SBM 52.

In step S103, the PDC 60A is configured to determine whether an SOC value of the 12V low-voltage battery in the first SBM 51 or the 24V low-voltage battery in the second SBM 52 is less than or equal to 80% based on the information collected in step S102. When it is determined that the SOC value of one of the low-voltage batteries is less than or equal to 80%, it is determined that the supplementary charging is required, and the step S103 proceeds to step S104.

In the step S104, the PDC 60A requests supplementary charging mode entering to a supplementary charging support controller, such as BMS or VCU, which is configured to control a high voltage junction box (HV J/BOX) 10 and checks a response from the supplementary charging support controller.

In step S105, it is checked whether a response that does not allow the supplementary charging mode entering is provided based on a response signal from the supplementary charging support controller checked in the step S104. Here, a condition that does not allow the supplementary charging mode entering includes: a first case of failures or no responses of all sorts of supplementary charging support controllers; a second case in which a wireless update for a high-voltage controller is being performed; a third case in which the SOC value of the high-voltage battery is less than 25% due to discharge thereof; a fourth case (maintenance window opened) in which a high voltage is not forcedly applied during maintenance; and a fifth case in which IG3 power for the supplementary charging mode entering is not applied.

Thus, when it is determined that a current condition corresponds to one of the above-described five cases that do not allow the supplementary charging mode entering described in the step S105, the PDC 60A performs step S106 to request, to the RPC 40A, smoothing supplementary charging based on the redundancy power conversion.

At the present point, the RPC (40A) compares the SOC value of the 12V low-voltage battery inside the first SBM (51) and the 24V low-voltage battery inside the second SBM (52). Based on the present comparison, in step S107, it identifies which battery needs supplementary charging.

When it is determined that the 24V low-voltage battery in the second SBM 52 requires the supplementary charging as a result of checking an object that requires supplementary charging in step S107, the RPC 40A is configured to perform step S108 to determine an estimated discharge time of the 24V low-voltage battery and then is configured to perform step S109 to check whether a hysteresis phenomenon occurs.

The RPC 40A is configured to determine in step S110 whether the smoothing supplementary charging based on the redundancy power conversion is possible based on the result checked in a process of the step S109 and the estimated discharge time determined in a process of step S108.

When it is determined in step S110 that the smoothing supplementary charging based on the redundancy power conversion is possible, the RPC 40A is configured to perform step S111 to perform the redundancy mode that converts a discharge voltage of the 12V low-voltage battery in the first SBM 51 into the 24V voltage.

Thus, in step S112, the RPC 40A converts the discharge voltage of the 12V low-voltage battery in the first SBM 51 into the 24V voltage based on the redundancy power conversion mode of the step S111 and transmits the converted 24V voltage to the second AJB 32 to form the supplementary charging path as illustrated in FIG. 3A.

On the other hand, when it is determined that the 12V low-voltage battery in the first SBM 51 requires the supplementary charging as a result of checking an object that requires supplementary charging in step S107, the RPC 40A is configured to perform step S113 to determine an estimated discharge time of the 12V low-voltage battery and then is configured to perform step S114 to check whether a hysteresis phenomenon occurs.

The RPC 40A is configured to determine in step S115 whether the smoothing supplementary charging based on the redundancy power conversion is possible based on the result checked in a process of the step S114 and the estimated discharge time determined in a process of step S113.

When it is determined in step S115 that the smoothing supplementary charging based on the redundancy power conversion is possible, the RPC 40A is configured to perform step S116 to perform the redundancy mode that converts a discharge voltage of the 24V low-voltage battery in the second SBM 52 into the 12V voltage.

Thus, in step S117, the RPC 40A converts the discharge voltage of the 24V low-voltage battery in the second SBM 52 into the 12V voltage based on the redundancy power conversion mode of the step S116 and transmits the converted 12V voltage to the first AJB 31 to form the supplementary charging path as illustrated in FIG. 3B.

In the above description, the estimated discharge time in the step S108 or the step S113 is determined by dividing a discharge current for 10 seconds by a capacity of the corresponding low-voltage battery.

Also, the checking of whether the hysteresis phenomenon occurs in the step S109 or the step S114 determines that there is a high possibility of occurrence of the hysteresis phenomenon when a difference between SOC values of the 24V low-voltage battery in the second SBM 52 and the 12V low-voltage battery in the first SBM 51 is less than or equal to 5%.

Thus, when there is a high possibility of occurrence of the hysteresis phenomenon or when the battery including a higher SOC value includes an estimated discharge time less than that of the battery including a lower SOC value, it is determined in the step S110 or the step S115 that the smoothing of the supplementary charging is not possible. In the instant case, step S122 is performed to notify an object that requires the supplementary charging and issue a warning on necessity of the supplementary charging.

After the step S112 or the step S117, the RPC 40A is configured to perform step S118 to recheck a possibility of occurrence of the hysteresis phenomenon according to the smoothing supplementary charging.

Thereafter, it is determined in step S119 whether the smoothing supplementary charging based on the redundancy power conversion is continued. When it is determined to be impossible, the process proceeds to step S122, and when it is determined to be possible, the above-described process is repeated.

Since processes of reference numerals S120 and S121 that are not described correspond to typical supplementary charging processes, descriptions thereof will be omitted.

In an exemplary embodiment of the present disclosure, the B2B may include IC (Integrated Circuit) and a plurality of field effect transistors (FETs) so that the IC is configured to control the voltage at the gate sides of the FETs to control the bidirectional flow of current through the FETs, the AJB may include a microcontroller unit, current/voltage sensors, one or more B2Bs, and a relay switching on or of a flow of current to each electric component, and the RPC may include a microcontroller unit, a boost/buck converting circuit, and one or more B2Bs connected between the converting circuit and the side of higher voltage to be converted.

According to an exemplary embodiment of the present disclosure, the supplementary charging method for the low-voltage battery based on the redundancy power conversion and the system for the same are provided to exhibit the effect of charging the low-voltage battery including the relatively low charged state by use of the low-voltage battery including the relatively high charged state based on the redundancy power conversion technology when the normal supplementary charging process using the high-voltage battery is not performed although the low-voltage battery requires the supplementary charging.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person having ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, multiple operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless stated otherwise, a singular expression includes a plural expression unless the context clearly indicates otherwise.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling charging of a battery of a vehicle, the method comprising:

determining whether supplementary charging is required for a first low-voltage battery or a second low-voltage battery while the vehicle is in a parked state;

determining whether supplementary charging mode entering using a high-voltage battery is possible when it is determined that the supplementary charging is required; and in response to determining that the supplementary charging mode entering using the high-voltage battery is not possible, converting and supplying a charging voltage of one low-voltage battery among the first low-voltage battery and the second low-voltage battery to the other low-voltage battery which is determined to require the supplementary charging wherein the converting and supplying of the charging voltage comprises:

transmitting, by a power-net domain controller (PDC), a smoothing supplementary charging request signal;

collecting and comparing state-of-charge (SOC) values of the first low-voltage battery and the second low-voltage battery in response to the smoothing supplementary charging request signal; and forming a supplementary charging path between the first low-voltage battery and the second low-voltage battery based on the comparison of the SOC values, thereby performing smoothing supplementary charging between the first low-voltage battery and the second low-voltage battery.

2. The method of claim 1, wherein the first low-voltage battery includes a 12V low-voltage battery.

3. The method of claim 1, wherein the second low-voltage battery includes a 24V low-voltage battery.

4. The method of claim 1, wherein the determining of whether the supplementary charging is required includes determining that the supplementary charging is required in response that a state of charge (SOC) value of the first low-voltage battery or the second low-voltage battery is a first predetermined value or less than the first predetermined value.

5. The method of claim 1, wherein the determining of whether the supplementary charging mode entering using the high-voltage battery is possible includes determining that the supplementary charging mode entering is not possible based on failures or non-responses of related controllers to the supplementary charging.

6. The method of claim 1, wherein the determining of whether the supplementary charging mode entering using the high-voltage battery is possible includes determining that the supplementary charging mode entering is not possible based on determining that an update on a control component of the high-voltage battery is in progress.

7. The method of claim 1, wherein the determining of whether the supplementary charging mode entering using the high-voltage battery is possible includes determining that the supplementary charging mode entering is not possible based on determining that an SOC value of the high-voltage battery is a second predetermined value or less than the second predetermined value.

8. The method of claim 1, wherein the determining of whether the supplementary charging mode entering using the high-voltage battery is possible includes determining that the supplementary charging mode entering is not possible based on determining that a maintenance operation is in progress as a maintenance window is opened.

9. The method of claim 1, wherein the determining of whether the supplementary charging mode entering using the high-voltage battery is possible includes determining that the supplementary charging mode entering is not possible based on determining that an IG3 power mode is not applied in the vehicle, and wherein the IG3 power mode is a power mode in which power is applied to at least one controller related to charging by an external power source a high-voltage battery which supplies for the supplementary charging.

10. The method of claim 1, wherein the converting and the supplying of the charging voltage includes:

detecting and comparing SOC values of the first low-voltage battery and the second low-voltage battery;

determining to supply a charging voltage of one low-voltage battery including a higher SOC value among the first low-voltage battery and the second low-voltage battery to the other low-voltage battery and forming a supply route; and smoothing by converting a discharge voltage of the one low-voltage battery into a voltage of the other low-voltage battery and supplying the converted voltage through the supply route.

11. The method of claim 10, wherein the converting and the supplying of the charging voltage further includes determining whether to continue the smoothing by detecting and comparing the SOC values of the first low-voltage battery and the second low-voltage battery.

12. The method of claim 11, wherein the determining of whether to continue the smoothing includes terminating the smoothing in response that at least one of the SOC values of the first low-voltage battery and the second low-voltage battery is a third predetermined value or less than the third predetermined value.

13. The method of claim 11, wherein the determining of whether to continue the smoothing includes terminating the smoothing in response that a difference between the SOC values of the first low-voltage battery and the second low-voltage battery is a first preset difference or less than the first preset difference.

14. The method of claim 10, wherein the detecting and the comparing of the SOC values includes:

determining estimated discharge time periods of the first low-voltage battery and the second low-voltage battery;

forming the supply route in response that the estimated discharge time period of one low-voltage battery including a lower SOC value is not greater than the estimated discharge time period of the other low-voltage battery; and terminating the smoothing in response that the estimated discharge time period of the one low-voltage battery is greater than the estimated discharge time period of the other low-voltage battery.

15. The method of claim 14, wherein the detecting and the comparing of the SOC values further includes forming of the supply route in response that a difference between the SOC values is a second preset difference or more than the second preset difference, and the SOC value of the one low-voltage battery is a fourth predetermined value or less than the fourth predetermined value.

16. The method of claim 15, wherein the detecting and the comparing of the SOC values further includes terminating the smoothing in response that the difference between the SOC values is less than the second preset difference, and the SOC value of the one low-voltage battery is greater than the fourth predetermined value.

17. A low-voltage battery supplementary charging system of a vehicle, the system comprising:

a high voltage junction box (HV J/BOX) that distributes a high voltage supplied from a main battery;

a first active junction block (AJB) including a back to back switch (B2B), the first AJB receiving a first low voltage output from a first low-voltage direct current (DC) to DC converter (LDC) and supplying the received first low voltage to a first electrical load;

a second AJB including a B2B, the second AJB receiving a second low voltage output from a second LDC and supplying the received second low voltage to a second electrical load;

a power-net domain controller (PDC) configured to supply power of the first low voltage and the second low voltage to the first electrical load and the second electrical load;

a first sub-battery module (SBM) including a first low-voltage battery which is charged by the first low voltage supplied from the first AJB and supplies power to the PDC and the first low-voltage load and a first intelligent battery sensor (IBS) which detects a state of the first low-voltage battery;

a second SBM including a second low-voltage battery which is charged by the second low voltage supplied from the second AJB and supplies power to the PDC and the second low voltage load and a second IBS that detects a state of the second low-voltage battery; and a redundancy power converter (RPC) configured to convert power between the first low voltage and the second low voltage according to a power conversion request signal generated by one AJB among the first AJB and the second AJB and supply the converted power to the one AJB, wherein the PDC is further configured to collect SOC information of the first and second low-voltage batteries from the first IBS and the second IBS, transmit a supplementary charging request signal based on determining that supplementary charging is required, and transmit a smoothing supplementary charging request signal to the RPC based on determining that the supplementary charging is not possible, wherein the RPC is further configured to, in response to the smoothing supplementary charging request signal from the PDC, collect and compare the SOC information of the first and second low-voltage batteries from the first IBS and the second IBS and form a supplementary charging path between the first SBM and the second SBM, performing smoothing the supplementary charging.

18. The system of claim 17, wherein while the smoothing of the supplementary charging is performed between the first SBM and the second SBM by the RPC, the PDC is further configured to collect SOC information of the first and second low-voltage batteries from the first IBS the second IBS to determine that the supplementary charging is completed, and request to the RPC to terminate the smoothing of the supplementary charging.

* * * * *